Patented May 25, 1954

2,679,498

UNITED STATES PATENT OFFICE 2,679,498

PREPARATION OF DIAZO CONDENSATION POLYMERS

Raymond P. Seven and James J. Miyashiro, Lake Geneva, Wis., assignors to Ringwood Chemical Corporation, a corporation of Illinois No Drawing. Application April 6, 1950, Serial No. 154,437

8 Claims. (Cl. 260—141)

Our invention relates to an improved method for the preparation of high molecular weight diazo compounds. More particularly, our invention relates to an improved method for the preparation of photosensitive diazo compounds of high molecular weight.

A number of processes are known for the rapid and economical reproduction of drawings and similar objects through the use of light sensitive diazo compounds. Thus, on exposing a film or coating containing a suitable diazo compound to light which first passes through a transparent or translucent sheet carrying opaque indicia thereon and which is in contact with the film or coating containing the diazo compound, the portions of the diazo compound that are exposed to light are destroyed while those protected by the opaque indicia remain unaffected. By treating the thus exposed film or coating with a suitable coupling agent, the unaffected portions react to produce an azo dye, thus reproducing the opaque indicia, while, obviously, in those portions of the film or coating where the diazo compound has been destroyed by exposure to light, no coupling occurs.

In self-coupling processes, the film or coating contains both the diazo compound and the coupling agent. In this modification various methods are used to prevent premature coupling of the two reactants. Thus, the film or coating may consist of a plurality of layers, one containing a diazonium compound, the other the coupling agent with, frequently, a third separation layer between the two. In another method, a diazonium compound and the coupling component are both present in a single layer but the environment is such (for example, slightly acid) that premature coupling does not occur. Or, a diazo compound may be used, such as an oxide or imide, which does not couple until the diazo oxide or imide ring has been broken by some suitable means, for example, by treatment with alkali. Such films or coatings are exposed to light as before and are then developed by methods selected in accordance with the particular conditions that obtain. Thus, exposed multilayer films or coatings may be developed by allowing diffusion to occur between the layer containing the diazo compound and that containing the coupler, for example, by dipping the multilayer film or coating into water or by exposing it to highly humid air. Exposed monolayer films or coatings containing diazo oxides or imides may be developed by making the layer or coating alkaline by dipping in a dilute solution of alkali or by exposure to moist air containing ammonia, the same development methods also being applicable to films or coatings in which premature coupling is prevented by an acid environment.

Another diazo reproduction process depends upon the fact that the photodecomposition products of certain diazo compounds are capable of "tanning" selected natural or synthetic organic colloidal materials. Thus, a film or coating containing a suitable diazonium compound and, for example, gelatine, may be exposed to light as previously described. The unexposed portions of the film or coating (that were protected by the opaque indicia) remain water soluble and water receptive while in the exposed portions the gelatine has been "tanned" and rendered ink receptive and water repellent, and accordingly the product may be employed in direct or offset lithography.

Many other diazo reproduction processes are known in the art but the above brief survey of some of the more important ones is sufficient to show the scope and importance of the field.

In many diazo reproduction processes, diazonium compounds of ordinary molecular weight are satisfactory but in some diazo reproduction processes diazonium compounds of high molecular weight are desirable or necessary. For example, it has been found that the photodecomposition products of certain high molecular weight diazo compounds are necessary in the conversion of selected natural or synthetic organic materials of colloidal nature from hydrophilic, water soluble materials to ink receptive and water repellent form. High molecular weight diazonium compounds may be made by diazotizing high molecular weight aromatic amines but usually such amines are difficult to prepare and/or diazotize. Accordingly, it has been suggested that high molecular weight diazonium compounds be prepared by the condensation of diazonium compounds of low molecular weight with compounds having a reactive carbonyl group such as aldehydes and ketones.

As is well known to those skilled in the art, aromatic hydrocarbons and certain derivatives thereof react with compounds containing a reactive carbonyl group, for example, formaldehyde, to form a wide variety of products. Thus, initially, one mole of an aromatic hydrocarbon or suitable derivative thereof reacts with one mole of formaldehyde to form a methylol derivative, this last then condensing with a second molecule of the aromatic or its derivative to form a methylene bridge with the elimination of water. Obviously, if the aromatic hydrocarbon or suitable derivative thereof possesses two or more reactive ring hydrogens, such a material can theoretically condense with an equimolecular quantity of formaldehyde to produce condensation polymers of extremely high molecular weight.

Diazonium compounds will condense with compounds containing a reactive carbonyl group in accordance with the above mechanism to give condensation polymers. However, since diazonium compounds are more or less unstable thermally, usually very unstable thermally, relatively few diazonium compounds are sufficiently reactive to condense with, say, formaldehyde at an appreciable rate at the low condensation temperatures that must be employed in view of the relatively low thermal stability of the diazonium compounds. Diazonium compounds exhibiting the requisite activity may be prepared by diazotizing an aromatic amine carrying a ring substituted activating group, at least two of the positions ortho and para to the activating group being unoccupied. Hydroxyl, amino, alkylamino and arylamino groups, among others, possess the requisite activating power. The following examples are illustrative of amines which produce diazonium compounds of sufficient reactivity and the proper configuration to form condensation polymers when allowed to react at low temperatures with compounds containing a reactive carbonyl group:

p-Phenylene diamine (after diazotizing one amino group)
p-Ethylamino aniline
p-Amino diphenylamine
3-amino carbazole
p-Amino phenol Activated hydrogens also result from the conversion of the benzene ring to a condensed ring system and accordingly such amines as:

Alpha and beta naphthylamine
2-amino fluorene
3-amino phenanthrene
3-amino chrysene
Amino pyrene, et cetera produce diazonium compounds which readily react with aldehydes and ketones at low temperatures to produce condensation polymers.

Diazonium compounds formed by diazotizing amines of the above or similar structures may be condensed with compounds containing a reactive carbonyl group such as aldehydes and ketones, specifically, such compounds as anthraquinone, phenanthraquinone, acetophenone, acetalaldehyde, formaldehyde, et cetera. Polymers such as paraldehyde, metaldehyde, trioxymethylene or paraformaldehyde may be employed. The desired condensation polymers are most conveniently prepared using formaldehyde. Since the reaction proceeds with the elimination of water, a condensing agent capable of uniting with this water is preferably present, strong sulfuric acid being eminently suited for the purpose. When this condensing agent is employed it is not best practice to use the formaldehyde solutions of commerce (formalin) so gaseous formaldehyde or, more conveniently, a formaldehyde polymer such as paraformaldehyde is used. The extent of the condensation reaction may be controlled by varying the reaction time and/or temperature and by changes in the concentration of the condensing agent.

In prior art procedures, at the conclusion of the condensing reaction, isolation of the diazonium condensation polymer is attempted by pouring the reaction mixture onto crushed ice. By this procedure, the desired product is, in large measure or completely, converted into a black, tarry material which is quite unsuited for use in diazo reproduction processes.

The principal object of our invention is to provide an improved process for the preparation of diazonium condensation polymers.

Another object of our invetnion is to provide a process for the preparation of diazonium condensation polymers in high yields.

A further object of our invention is to provide a process for the production of diazonium condensation polymers whereby said products are obtained in the form of free flowing powders.

An additional object of our invention is to provide a process for the production of water soluble diazonium condensation polymers in the form of free flowing powders.

Other objects of our invention will become apparent as the description thereof proceeds.

We have found that the diazonium condensation polymers formed by the interaction of suitable diazonium compounds and a compound containing a reactive carbonyl group can be isolated from the reaction mixture as water soluble, free flowing powders of good color and free from tarry contaminants, by diluting the reaction mixture, preferably slowly and with vigorous stirring, with a large volume of a water miscible alcohol such as methanol, ethanol, isopropanol and the like and then preferably triturating the resulting precipitate with further volumes of fresh, water miscible alcohol. By operating in this manner, the diazo condensation polymer is precipitated as an amorphous powder, or, occasionally, as a taffy-like solid. If the stirring of the taffy-like solid with the drowning alcohol is continued, it is converted to an amorphous powder. If this conversion does not occur within a reasonable time, it may be accomplished by decanting the drowing alcohol from the precipitate and replacing with fresh alcohol. When triturated with this fresh alcohol, the taffy-like condensation polymer rapidly changes to a fine powder of good color which remains free flowing after separation from the alcoholic liquor and drying.

The resulting diazonium condensation polymer may be incorporated into the final film or coating by any suitable method. For example, the water soluble diazonium condensation polymer of our invention may be dissolved in water and the resulting solution (which may contain additional ingredients) may be applied to a suitable base with a doctor blade or a suitable film may be passed through the solution whereby the film becomes impregnated with the active compound. Other suitable solvents may be employed if desired. Also, double salts of the diazonium condensation polymer may be prepared, for example, double salts with such compounds as zinc chloride, aluminum sulfate, cadmium chloride and the like, and these may be employed in making photosensitive films or coatings in place of the diazonium condensation polymer itself.

For the better understanding of our invention, the following illustrative but non-limiting examples thereof are given:

*Example 1*

Sulfuric acid (750 cc., 98%) was placed in a vessel provided with a stirrer and surrounded by an ice-salt bath. The acid was stirred and cooled and then 450 g. (1.535 moles) of p-diazonium diphenylamine sulfate were added following which the reaction mixture was brought to a temperature of 6° C. A total of 60 g. (2.000 moles) paraformaldehyde were then added at such a rate that the temperature did not exceed 10° C., some three hours being required. After addition of the aldehyde was complete, the reaction was allowed to continue for thirty minutes after which 6 l. ethanol were added, stirring being continued. The alcoholic liquor was separated by decantation from the precipitated taffy-like solid, the latter then being triturated with some 6 l. additional alcohol during which operation the original taffy-like solid changed to a greenish-yellow powder which was separated and air dried to give a free flowing powder. Yield, 445 g., equivalent to 97% theory, assuming the diazonium compound and the aldehyde condense in equimolecular ratio with the elimination of water.

*Example 2*

The procedure of Example 1 was followed with the exceptions that 66° Bé. sulfuric acid was employed as the condensing agent and, a quarter hour after addition of paraformaldehye was complete, the cooling bath was removed and the temperature allowed to rise to 10° C. (one hour) following which the reaction mixture was heated to 40° C. and maintained in the range 35 to 45° C. for three hours. On working up as before, 342 g. greenish yellow powder resulted equivalent to 74.5% theory.

*Example 3*

The procedure of Example 1 was followed with the exception that 80% sulfuric acid was employed as the condensing agent. Yield, 380 g., 83% of theory.

It will be noted that, in accordance with our invention, the reaction time measured from the start of the addition of the compound containing the reactive carbonyl group until the stopping of the reaction by addition of a large volume of water miscible alcohol is in the neighborhood of three to six hours. By operating in this manner, diazonium condensation polymers are produced which are water soluble but at the same time are of sufficiently high molecular weight to be applicable in the previously mentioned "tanning" procedure. When the condensation reaction is allowed to proceed for an extended period, for example, 24 hours, the resulting condensation polymer is insoluble or but slightly soluble in water.

Diazonium condensation polymers prepared in accordance with the above examples or suitable modifications thereof are eminently suited for use in the formulation of light sensitive films or coatings. When admixed with selected natural or synthetic organic colloidal materials the photodecomposition products of the diazonium condensation polymers "tan" said added materials and render them water repellent but receptive to ink. Among organic colloidal materials which are readily "tanned" by the photodecomposition products of the diazonium condensation polymers of our invention may be mentioned glue, gelatine, casein, water soluble cellulose ethers and esters, water soluble polyvinyl alcohol and the like.

Be it remembered, that while our invention has been described in connection with specific details thereof, these are illustrative only and in no way limit the scope thereof except as these may be incorporated in the accompanying claims.

We claim:

1. A process for the isolation of diazonium condensation products from the mixture produced by the interaction, in the presence of strong sulfuric acid, of a diazonium salt and formaldehyde, consisting of treating said reaction mixture with a large volume of a water soluble aliphatic alcohol whereby the diazonium condensation products are precipitated as a solid uncontaminated with dark colored tarry byproducts.

2. A process for the isolation of diazonium condensation products from the mixture produced by the interaction, in the presence of strong sulfuric acid, of a diazonium salt and formaldehyde, consisting of treating said reaction mixture with a large volume of a water soluble aliphatic alcohol and separating and drying the resulting precipitate whereby the diazonium condensation products are obtained as a free flowing powder uncontaminated with dark colored tarry byproducts.

3. A process for the isolation of diazonium condensation products from the mixture produced by the interaction, in the presence of strong sulfuric acid, of a diazonium salt and paraformaldehyde, consisting of treating said reaction mixture with a large volume of a water soluble aliphatic alcohol whereby the diazonium condensation products are precipitated as a solid uncontaminated with dark colored tarry byproducts.

4. A process for the isolation of diazoninum condensation products from the mixture produced by the interaction, in the presence of strong sulfuric acid, of a diazonium salt and paraformaldehyde, consisting of treating said reaction mixture with a large volume of a water soluble aliphatic alcohol and separating and drying the resulting precipitate whereby the diazonium condensation products are obtained as a free flowing powder uncontaminated with dark colored tarry byproducts.

5. A process for the isolation of condensation polymers of a p-diazonium diphenylamine salt from the mixture produced by the interaction, in the presence of strong sulfuric acid, of a p-diazonium diphenylamine salt and formaldehyde, consisting of treating said reaction mixture with a large volume of ethanol whereby the condensation polymers of the p-diazonium diphenylamine salt are precipitated as a solid uncontaminated with dark colored tarry byproducts.

6. A process for the isolation of condensation polymers of a p-diazonium diphenylamine salt from the mixture produced by the interaction, in the presence of strong sulfuric acid, of a p-diazonium diphenylamine salt and formaldehyde, consisting of treating said reaction mixture with a large volume of ethanol and separating and drying the resulting precipitate whereby the condensation polymers of the p-diazonium diphenylamine salt are obtained in the form of a free flowing solid uncontaminated with dark colored tarry byproducts.

7. A process for the isolation of condensation polymers of a p-diazonium diphenylamine salt from the mixture produced by the interaction, in the presence of strong sulfuric acid, of a p-diazonium diphenylamine salt and paraformaldehyde, consisting of treating said reaction mixture with a large volume of ethanol whereby the condensation polymers of the p-diazonium diphenylamine salt are precipitated as a solid uncontaminated with dark colored tarry byproducts.

8. A process for the isolation of condensation polymers of a p-diazonium diphenylamine salt from the mixture produced by the interaction, in the presence of strong sulfuric acid, of a p-diazonium diphenylamine salt and paraformaldehyde, consisting of treating said reaction mixture with a large volume of ethanol and separating and drying the resulting precipitate whereby the condensation polymers of the p-diazonium diphenylamine salt are obtained as a free flowing solid uncontaminated with dark colored tarry byproducts.

References Cited in the file of this patent

UNITED STATES PATENTS

| Number | Name | Date |
|---|---|---|
| 2,063,631 | Schmidt et al. | Dec. 8, 1936 |
| 2,106,539 | Schnitzspahn | Jan. 25, 1938 |
| 2,498,722 | Straley | Feb. 28, 1950 |